United States Patent [19]
Cecchin et al.

[11] Patent Number: 5,298,561
[45] Date of Patent: Mar. 29, 1994

[54] PROPYLENE POLYMER COMPOSITION HAVING GOOD TRANSPARENCY AND IMPROVED IMPACT RESISTANCE

[75] Inventors: Giuliano Cecchin; Floriano Guglielmi, both of Ferrara, Italy

[73] Assignee: Himont Incorporated, Wilmington, Del.

[21] Appl. No.: 998,261

[22] Filed: Sep. 11, 1992

Related U.S. Application Data

[63] Continuation of Ser. No. 450,780, Dec. 14, 1989, abandoned.

Foreign Application Priority Data

Dec. 14, 1988 [IT] Italy ................. 22940 A/88

[51] Int. Cl.$^5$ ............ C08L 23/08; C08L 23/16; C08L 23/14
[52] U.S. Cl. ........................ 525/240; 525/322; 525/323
[58] Field of Search .............. 525/322, 323, 240

[56] References Cited

U.S. PATENT DOCUMENTS

| | | | |
|---|---|---|---|
| 4,245,062 | 1/1981 | Suzuki et al. | 525/240 |
| 4,395,519 | 7/1983 | Minami et al. | 525/75 |
| 4,547,552 | 10/1985 | Toyota et al. | 525/322 |
| 4,576,994 | 3/1986 | Dorrer et al. | 525/247 |
| 4,634,740 | 1/1987 | Fujita et al. | 525/240 |
| 5,023,300 | 6/1991 | Huff et al. | 525/322 |
| 5,212,246 | 5/1993 | Ogale | 525/240 |

FOREIGN PATENT DOCUMENTS

| | | |
|---|---|---|
| 0045977 | 2/1982 | European Pat. Off. . |
| 0067525 | 12/1982 | European Pat. Off. . |
| 0077532 | 4/1983 | European Pat. Off. . |
| 0086300 | 8/1983 | European Pat. Off. . |
| 0145368 | 6/1985 | European Pat. Off. . |
| 0170255 | 2/1986 | European Pat. Off. . |
| 55-073741 | 6/1980 | Japan . |

Primary Examiner—Carman J. Seccuro, Jr.

[57] ABSTRACT

Propylene polymer compositions having good transparency and improved impact resistance at low temperature comprising:
a) 70 to 98% by weight crystalline copolymer of ethylene with propylene and/or with an alpha olefin of the formula $H_2C=CHR$ where R is a $C_{2-8}$ linear or branched alkyl radical and b) 2 to 30% by weight of an elastomeric propylene-ethylene copolymer. The portion of said copolymer b) soluble in xylene at room temperature has an intrinsic viscosity (I.V. 2) which satisfies the following relation:

$$0.2 \leq (I.V.\ 2/I.V.\ 1) \times (C_2^-) \leq 0.6$$

where I.V. 1 is the intrinsic viscosity of the crystalline propylene copolymer, ($C_2^-$) is the ethylene weight content of b). The ratio between the ethylene weight content in b) and the weight of the xylene soluble portion is equal to or less than 1.5.

The compositions are prepared by sequential polymerization of the monomers in the presence of Ziegler-Natta stereospecific catalysts which include a titanium compound supported on a magnesium dihalide in active form.

4 Claims, No Drawings

PROPYLENE POLYMER COMPOSITION HAVING GOOD TRANSPARENCY AND IMPROVED IMPACT RESISTANCE

This application is a continuation, of application Ser. No. 07/450,780, filed Dec. 14, 1989, now abandoned.

DESCRIPTION

This invention relates to propylene polymer compositions which have improved impact resistance characteristics at low temperatures and good transparency.

It is known that for certain applications it is useful to decrease the crystallinity of polypropylene homopolymer by simultaneous copolymerization of propylene with small quantities of ethylene and/or alpha-olefins, such as butene, pentene and hexene.

In this manner one obtains the so called random crystalline propylene copolymers which, as compared to the homopolymer, generally have better flexibility and transparency.

These copolymers can be used in many application sectors, such as for instance irrigation tubes (water hoses), transporting drinking water and other liquid foods, heating equipment, single layer bottles for detergents, multilayer bottles for beverages, perfumes, single or coupled film for various packaging, rigid food containers.

Propylene random copolymers, however, although they have good transparency, do not offer, especially at low temperatures, better impact resistance with respect to the homopolymer, which is required for the applications listed above.

It has been known for a long time that the impact resistance of the polypropylene can be improved by adding an adequate quantity of propylene-ethylene elastomeric copolymer by mechanical mixing or sequential polymerization; usually, however, this copolymer loses its transparency.

To avoid this disadvantage, it has been suggested to mix polypropylene, in the melt phase, with propylene-ethylene copolymers obtained with specific catalysts and having a specific ethylene content of 70 to 85% by weight (U.S. Pat. No. 4,634,740). It is further pointed out that lower or higher ethylene contents in the copolymer do not give the desired results. However, the preparation of such compositions requires the separate synthesis of the homopolymer and the copolymer, and their subsequent mixing. This clearly presents a disadvantage from the point of view of initial investment and on going cost to produce such material. An added disadvantage is that the propylene-ethylene copolymer is synthesized with catalysts which lack a sufficiently high catalytic activity to avoid the removal of catalyst residues.

Surprisingly, it has now been found that one can avoid the above disadvantages and obtain propylene polymer compositions with good transparency and satisfactory impact resistance through a process comprising the sequential polymerization of propylene-/ethylene mixtures or propylene/ethylene/higher alpha-olefin mixtures to copolymers of adequate molecular weight, by using sterospecific high yield catalysts supported on magnesium dihalides in active form.

Thus the separate preparation of the components, the expensive mixing of the components in the melt state as well as the purification of the separate copolymer components are eliminated.

Compositions prepared by sequential two stage polymerization with high yield stereospecific catalysts supported on magnesium dichloride in active form, containing elastomeric propylene-ethylene copolymers with an ethylene content within the range of 70 to 85% by weight disclosed in U.S. Pat. No. 4,634,740, have given very poor results as far as impact resistance at low temperatures is concerned. The transparency of the above compositions was satisfactory only if the intrinsic viscosity of the portion of the elastomeric copolymer soluble in xylene at room temperature as compared to the intrinsic viscosity of the crystalline copolymer of propylene prepared in the first stage and the content of ethylene of the elastomeric copolymer meet certain critical values.

The prior art does not teach or suggest that random propylene crystalline copolymers could be obtained through sequential polymerization with high yield catalysts supported on magnesium dihalides, which would have good transparency and improved impact resistance characteristics at low temperatures. Now it has been found that it is possible to prepare such propylene crystalline copolymers meeting the requirements indicated above.

The compositions of the invention which satisfy the above requirements, comprise (a) from 70% to 98% (e.g. from 85% to 98%, preferably from 80% to 95%) by weight of a crystalline copolymer of propylene with ethylene and/or with an alpha olefin of the formula $CH_2=CHR$, where R is a linear or branched alkyl radical with 2-8 carbon atoms, containing 85 to 99.5% by weight of propylene, preferably from 90 to 98% of propylene, and 0.5 to 10%, preferably from 1 to 5% by weight of ethylene and/or the alpha olefin $CH_2=CHR$ (Fraction I), and (b) from 2 to 30% (e.g. from 2% to 15%, preferably from 5% to 20%) by weight of an elastomeric copolymer of ethylene with propylene and-/or a $CH_2=CHR$ alpha olefin, containing from 20 to 70%, preferably 25 to 60% by weight, of ethylene (Fraction II), the elastomeric copolymer being partially soluble in xylene at room temperature, and the ratio between the ethylene weight content of the copolymer and the weight of the portion of copolymer soluble in xylene being equal to or less than 1.5 while the intrinsic viscosity (I.V.2) of the portion soluble in xylene satisfies the following relation;

$$0.2 \leq (I.V.2/I.V.1) \times (C_2^-) \leq 0.6$$

where: I.V.1 is the intrinsic viscosity of the crystalline copolymer (I.V.1 and I.V.2 being expressed in dl/g), and $(C_2^-)$ is the weight ethylene content of Fraction II.

In the preferred compositions the weight percentage of the fraction soluble in xylene at room temperature is between 10 and 25% (e.g. between 10 and 15%), while the ratio between the weight of ethylene in the elastomeric copolymer and the weight of the fraction soluble in xylene ranges from 0.3 to 1.5 (e.g. from 0.3 to 0.9).

By varying the composition of the crystalline propylene copolymer the rigidity of the final product will decrease as the comonomer content of said copolymer increases and at the same time, the transparency will be improved.

The percentage by weight of the elastomeric copolymer of ethylene (Fraction II) which is comprised between 2 and 30%, preferably between 5 and 20% by weight of the final composition, is critical in the sense that lower percentages are insufficient for the achievement of a satisfactory level of impact resistance, while higher percentages cause an excessive decrease of rigidity.

The composition and the molecular weight of Fraction II are also critical. If the ethylene content of said fraction is less than 20% or more than 70% by weight, the impact resistance and/or transparency are unsatisfactory. If the intrinsic viscosity of the portion of Fraction II which is soluble in xylene at room temperature compared to the intrinsic viscosity of the crystalline copolymer and the ethylene content of Fraction II do not satisfy the relation $$0.2 \leq (I.V.2/I.V.1) \times (C_2^-) \leq 0.6$$

no satisfactory results are obtainable. More precisely the optic properties of the compositions are unsatisfactory for values greater than 0.6 while for values lower than 0.2 the impact resistance is poor.

The intrinsic viscosity of Fraction I may vary from 1 to 4 dl/g, corresponding to a melt index (M.I.) between about 80 and 0.1 g/10', respectively.

The M.I. of the final composition is generally from 0.1 to 50 g/10', preferably between 0.5 and 30 g/10'. Nucleants may be added to the compositions using substances well known by the experts in the field to act as nucleants in order to further enhance the transparency and rigidity.

The compositions of the invention are prepared by sequential polymerization of the monomers in the presence of stereospecific Ziegler-Natta catalysts supported on magnesium dihalides in active form. Such catalyst contain, as an essential element, a solid catalyst component comprising a titanium compound having at least one halogen-titanium bond, and an electron-donor compound supported on a magnesium dihalide in active form.

The catalysts used in the process of the invention are characterized by the fact that they produce polypropylene with an isotactic index higher than 90% in liquid propylene at 70° C. and in the presence of hydrogen in such a concentration as to provide a polymer having a M.I. between 1 and 10 g/10'. Catalysts with the above indicated characteristics are well known in patent literature.

Particularly advantageous are the catalysts described in U.S. Pat. No. 4,339,054 and European patent 45,977. Other examples of such catalysts are described in U.S. Pat. Nos. 4,472,524 and 4,473,660.

The solid catalytic components used in these catalysts include, as electron-donor compounds, ethers, ketones, lactones; compounds containing atoms of N, P and/or S, and esters of mono and dicarboxylic acids.

Particularly suited are the esters of phthalic acid, such as diisobutyl, dioctyl and diphenylphthalate, benzylbutylphthalate; the esters of malonic acid, such as diisobutyl and diethyl malonate; alkyl and arylpivalates; the alkyl, cycloalkyl and aryl maleates; alkyl and aryl carbonates, such as diisobutyl carbonate; ethyl-phenyl carbonate and diphenyl carbonate; succinic acid esters, such as mono and diethyl succinate. The phthalic acid esters are the preferred electron donors.

There are various methods of preparing the above mentioned catalyst components.

The magnesium dihalide, for example (used in the anhydrous state containing less than 1% water), the titanium compound and an electron-donor compound can be milled together under conditions which cause activation of the magnesium dihalide. The milled product is then treated one or more times with an excess of TiCl₄ at a temperature between 80° and 135° C. and washed repeatedly with a hydrocarbon (e.g. hexane) until all chlorine ions have disappeared from the wash.

According to another methods, the anhydrous magnesium halide is preactivated following known methods and then treated with an excess of $TiCl_4$ containing an electron-donor compound in solution at a temperature between 80° and 135° C. The treatment with $TiCl_4$ is eventually repeated and the solid is then washed with hexane or other suitable hydrocarbon solvent to eliminate all traces of unreacted $TiCl_4$.

According to another method a $MgCl_2.nROH$ (preferably in spherical particle form) where n is usually between 1 and 3, and ROH is ethanol, butanol, isobutanol, is treated with an excess of $TiCl_4$ containing an electron-donor in solution. The temperature ranges generally between 80° and 120° C. The solid is isolated and treated again with $TiCl_4$. The solid is separated and washed with a hydrocarbon until all chlorine ions have disappeared from the wash.

According to another method, alcoholates and chloroalcoholates of magnesium (the chloroalcoholate prepared according to the method described in U.S. Pat. No. 4,220,554), are treated with an excess of $TiCl_4$ containing an electron-donor compound in solution, under the reaction conditions described above.

According to yet another method, complexes of magnesium halides with titanium alcoholates (the $MgCl_2.2Ti(OC_4H_9)_4$ complex is a typical example) are treated, in a hydrocarbon solution, with $TiCl_4$ in excess containing an electron-donor compound in solution. The solid product is isolated and treated again with an excess of $TiCl_4$, separated and washed with a hydrocarbon compound such as hexane. The $TiCl_4$ treatments are conducted at a temperature ranging between 80° and 120° C. According to a variation of this, the complex between the $MgCl_2$ and titanium alcoholate is reacted in a hydrocarbon solution with hydropolysiloxane, the solid product is separated and reacted at 50° C. with silicon tetrachloride containing an electron-donor in solution. The solid is separated and then treated with $TiCl_4$ in excess at 80°-100° C.

It is also possible to treat with an excess of $TiCl_4$ containing an electron-donor in solution porous resins, styrene-divinylbenzene in spherical particle form, or porous inorganic supports such as silica and alumina, impregnated with magnesium compounds or complexes soluble in organic solvents.

Useful porous resins and their method of impregnation are described in the application for U.S. counterpart Italian patent no. 20811 A/88.

The treatment with $TiCl_4$ is done at 80°-100° C.; after separating the unreacted $TiCl_4$, the treatment is repeated, the solid separated and then washed with hydrocarbon solvent.

The molar ratio of $MgX_2$ with the electron-donor compound used in the above mentioned reactions is usually between 4:1 and 12:1.

The amount of electron-donor compound fixed on the solid component is generally from 5 to 20 mole % with regard to the magnesium dihalide.

However, in the case of resinous and inorganic supports, the molar ratio of the magnesium compound and the electron donor is higher, and usually is for an electron 0.3 to 0.8.

In the solid catalyst component the Mg/Ti ratio is generally between 30:1 and 4:1; in the solid catalyst components supported on resinous or on inorganic supports, the ratio is lower and usually is from 3:1 to 2:1.

The useful titanium compounds for the preparation of the solid catalytic components are the halides and the halogen alcoholates. Titanium tetrachloride is the preferred compound.

Satisfactory results are obtained also with titanium trihalides; specifically $TiCl_3 HR$, $TiCl_3 ARA$, and with halogen alcoholates such as $TiCl_3OR$ where R is a phenylic radical.

The above reactions result in the formation of magnesium dihalides in active form. Besides these reactions, other reactions are well known in literature, which result in the formation of magnesium dihalide in active form from magnesium compound different than the halides, such as magnesium alcoholates or carboxylates.

The active form of the magnesium halides in solid catalyst components is evidenced by the fact that in the X-ray spectrum of the solid catalyst component the high intensity diffraction line which appears in the spectrum of the non-activated magnesium dihalides (having a surface area less than 3 $m^2/g$) is absent and instead there is a halo, with the maximum intensity shifted with respect to the position of the high intensity diffraction line of the non-activated magnesium dihalide, or by the fact that said high intensity diffraction line shows a broadening having a half peack breadth, at least 30% greater than the one of the highest intensity diffraction line.

The most active forms are those in which the halo appears in the X-ray spectrum of the solid catalyst component.

Among the magnesium dihalides, the chloride is the preferred compound. In the case of the most active forms of magnesium dichloride, the X-ray spectrum of the solid catalytic component shows a halo, instead of the diffraction line which appear in the spectrum of the non activated magnesium dichloride, at a distance of 2.56 A.

The Al-Alkyl compounds useful as co-catalysts include the Al-trialkyls, such as Al-triethyl, Al-triisobutyl, Al-tri-n-butyl and linear or cyclic Al-Alkyl compounds containing two or more Al atoms, linked together through O, or N atoms or $SO_4$ and $SO_3$.

Examples of these compounds are:

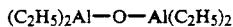

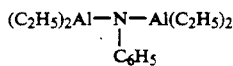

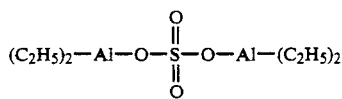

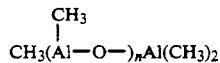

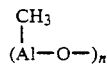

where n is a number between 1 and 20.

Moreover, one can use $AlR_2OR'$, where R' is an aryl radical substituted in one or both of the positions, and R is an alkyl radical with 1-6 carbon atoms; and $AlR_2H$ compounds, where R has the above indicated meaning.

The Al-alkyl compound is used in an amount such that the Al/Ti ratios are from 1 to 1000.

The electron-donor compounds that can be used as electron donors with the Al-alkyl compound cocatalyst include aromatic acids esters, such as alkyl benzoates, and specifically 2,2,6,6-tetramethylpiperidene and 2,6-diisopropylpiperidine or silicon compounds containing at least one Si-OR link (R=hydrocarbyl radical).

Examples of suitable silicon compounds are (t-butyl)$_2$-Si(OCH$_3$)$_2$, (cyclohexyl)$_2$Si(OCH$_3$)$_2$, (phenyl)$_2$Si(OCH$_3$)$_2$.

The molar ratio between the Al-alkyl compound and electron-donor used therewith is generally between 5:1 and 100:1.

The polymerization is conducted in at least two stages. In one stage Fraction I is prepared and in the other Fraction II is prepared, in the presence of the polymer and the catalyst used in the Fraction I stage. The polymerization may be conducted in a continuous or batch manner, following known techniques, in liquid phase, in the presence or absence of an inert diluent; or in gas phase, or in a combination of liquid and gas phases.

The reaction times and temperature used in the two stages are not critical. However it is best if they ranged between 0.5 and 5 hrs, and 50°-90° C., respectively. Regulation of the molecular weight is obtained by using known regulators, particularly hydrogen.

As already indicated the alpha olefins that can be polymerized with propylene in the formation of the crystalline propylene copolymer, and in the formation of the elastomeric copolymer of ethylene and propylene, include $CH_2=CHR$ olefins where R is H or an alkyl radical with 2-8 carbon atoms. Examples of such olefins are butene-1, pentene-1, hexene-1, 4-methylpentene-1. Details relating to the methods of preparation and the characterization of the products obtained will be clearly shown by the following examples, which illustrate but do not limit the invention.

EXAMPLES 1-7 AND COMPARISON EXAMPLES 1C-6C

Methods of analysis used

Intrinsic viscosity

Determined in tetrahydronaphthalene at 135° C.

Melt index

Determined according to ASTM D 1238, condition L.

Ethylene content ($C_2$)

Determined by I.R. spectroscopy

Fractions soluble and insoluble in xylene

Determined by solubilizing a sample of material in xylene at 125° C. and cooling the solution to room temperature. The soluble and insoluble fractions are separated by filtration.

Flex modulus

Determined according to ASTM D 790 (tangent).

Izod impact resistance

Determined according to ASTM D 256 (notched)

Ductile/fragile transition temperature

Determined according to an internal HIMONT method, which is available from request.

Ductile/fragile transition means the temperature at which 50% of the sample shows fragile breakage when submitted to the impact of a falling hammer having a predetermined weight and falling from a predetermined height.

Haze

Determined according to ASTM D 1003 on plates 1 mm thick.

Tensile properties

Determined according to ASTM D 638.

Fraction II content (% by weight)

Determined by comparing the weight of the copolymer formed in the second phase to the final product.

The copolymer weight was determined by measuring, via calibrated flowmeters with a Fraction II±1 g precision, the weight of the ethylene and the propylene fed during phase.

Intrinsic viscosity I.V.2.

The intrinsic viscosity of the xylene soluble part (I.V.2) was calculated according to the following formula:

$$I.V.2. = (I.V._{SF} - I.V._{SI}X_I)/(1-X)$$

where:

I.V.$_{SF}$ is the intrinsic viscosity of the xylene soluble fraction of the final composition; I.V.$_{SI}$ is the intrinsic viscosity of the xylene soluble part of the product obtained in the first polymerization phase;

$X_I$ is equal to:

$S_I \cdot Q_I/S_F$ where $S_I$ is the weight percent of fraction I soluble in xylene, $S_F$ is the weight percentage of xylene soluble in the final product, and $Q_I$ is the weight fraction of the product obtained in Fraction I phase compared to the total product.

The pelletizing and the molding of the samples for the physical/mechanical characterization were done by pelletization at 220° C. for the unnucleated products and at 230° C. for the nucleated ones.

The molding was done at 190° C. for the plates used to determine the haze, and at 210°–230° C. (depending on the Melt Index) for the other plates.

The process conditions and the characteristics of the products of the invention and of the comparative examples are shown in TABLES 1 and 1B. Tables 2 and 2B show their physical-mechanical properties.

Method of operating

The polymerization tests were conducted in a 22 liter stainless steel autoclave with a magnetic helicoidal agitator operating at about 90 rpm.

Unless otherwise specified, temperature and pressure were maintained constant throughout the course of the reaction and hydrogen was used as molecular weight regulator.

The gas phase (propylene, ethylene, higher alpha-olefin and hydrogen) is continuously analyzed via gas-chromatography.

The process is done in two phases. In the first phase, propylene is copolymerized with ethylene or an other alpha-olefin to obtain the crystalline copolymer (Fraction I).

The polymerization in this phase is carried out in a liquid propylene suspension maintaining an adequate and constant overpressure of the desired comonomer.

In the second phase ethylene is copolymerized with propylene and/or higher alpha olefins to obtain the elastomeric fraction (Fraction II). This stage is carried out in gas phase while maintaining the composition of the gaseous mixture constant.

A) 1st PHASE

In the autoclave, at room temperature, the following were introduced in order: 16 liters of liquid propylene, the desired quantity of ethylene and/or higher alpha olefin and hydrogen and the catalyst system formed from a solid catalyst component as indicated below, and a mixture of 75 ml of triethyl aluminum and 3.5 g of cyclohexyl methyldimethoxysilane.

The solid catalyst component was prepared as follows: in a 1 l glass flask equipped with a condenser, mechanical agitator and thermometer, 625 ml of TiCl$_4$ were introduced under an anhydrous nitrogen atmosphere. While agitating at 0° C., 25 g of spherical support, MgCl$_2$.2,1C$_2$H$_5$OH, prepared according to the methods described in example 1 of U.S. Pat. No. 4,469,648 are fed.

The ingredients were heated to 100° C. in 1 hour. When the temperature reached 40° C., 9 mmoles of diisobutylphthalate was introduced. The reaction conditions were maintained at 100° C. for 2 hours and then the reaction mixture was allowed to settle. The supernatant liquid was then syphoned. 550 ml of TiCl$_4$ were then added and heated to 120° C. for 1 hour. Again the reaction mixture was allowed to settle and the supernatant was syphoned off.

The solid residue was washed 6 times with 200 cc aliquots of anhydrous hexane at 60° C. and 3 times at room temperature.

The catalyst system described above was fed under propylene pressure. The temperature was brought up to 70° C. in about 10 minutes and maintained at that temperature during the entire course of the polymerization, while at the same time, feeding ethylene and/or higher alpha olefin and hydrogen at a rate and in an amount sufficient to maintain the concentration in the gas phase of the reactor constant.

After the polymerization is essentially complete, practically all the unpolymerized monomer was removed by degassing at atmospheric pressure.

B) 2nd PHASE

The resulting crystalline propylene copolymer product (Fraction I) was then heated to 70° C., after having removed a portion for various analyses, through a ball valve located at the bottom of the autoclave. A sufficient amount of ethylene and propylene and/or higher alpha olefin were fed, in a ratio and in quantities necessary to obtain the composition of the gaseous phase and preestablished pressure (such quantities will be called, respectively, saturation ethylene and propylene and/or higher alpha-olefin).

During polymerization, the pressure and composition of the gas phase were maintained constant by feeding hydrogen and a ethylene-propylene and/or higher alpha-olefin mixture which had the same composition of the desired copolymer (Fraction II). The feeding of the individual monomers was done with flow meter and the composition of the mixture and the quantity consumed is determined with recording/totalizing instruments.

The length of the feeding time varied according to the reactivity of the mixture used and the amount of the copolymer necessary to give the desired proportion between Fraction II and Fraction I.

At the end of the run the powder was discharged, stabilized following known techniques, dried in an oven at 60° C. under a nitrogen flow and pelletized.

The product may be eventually nucleated by adding an adequate quantity of DBS (di-benzylidenesorbitol), usually 2000 ppm, prior to pelletizing.

TABLE 1B-continued

| | EXAMPLES | | | |
|---|---|---|---|---|
| | 8 | 9 | 10 | 7C* |
| Xylene soluble fraction, % wt. | 6.4 | 4.4 | 7.5 | 6.5 |
| IV soluble of xylene fraction, dl/g. | 1.17 | 1.38 | 0.80 | 1.26 |
| xylene insoluble fraction, % wt. | 93.6 | 95.6 | 92.5 | 93.5 |
| IV insoluble xylene fraction, dl/g. | 2.50 | 2.56 | 2.43 | 2.45 |
| 2ND PHASE | | | | |
| Pressure, kg/cm | 4.0 | 5.9 | 7.4 | 6.8 |
| Time, min. | 180 | 160 | 130 | 550 |
| Butene-1 (saturation), g | 200 | 200 | 136 | 136 |
| Ethylene (saturation), g | 21 | 51 | 86 | 86 |
| Ethylene, mixture fed, % wt. | 33.0 | 47.0 | 68.5 | 67.0 |
| Hydrogen in gas phase, % mol. | 0.1 | 6.6 | 15.9 | 4.1 |

TABLE 1

| Examples and comparative examples | 1 | 2 | 3 | 4 | 5 | 6 | 7 | 1C | 2C | 3C | 4C | 5C | 6C |
|---|---|---|---|---|---|---|---|---|---|---|---|---|---|
| 1st. PHASE | | | | | | | | | | | | | |
| Pressure Kg/cm | 30.9 | 31.1 | 31.1 | 31.1 | 30.8 | 30.8 | 31.0 | 30.8 | 31.1 | 30.9 | 31.0 | 30.9 | 30.9 |
| Time min. | 120 | 120 | 120 | 120 | 120 | 120 | 120 | 120 | 120 | 110 | 150 | 240 | 110 |
| Ethylene in gas phase % mol. | 1.6 | 2.0 | 2.3 | 2.2 | 1.6 | 1.6 | 2.0 | 1.8 | 2.0 | 1.6 | 1.8 | 1.8 | 1.6 |
| Hydrogen in gas phase % mol. | 0.5 | 0.5 | 0.3 | 0.3 | 0.3 | 0.3 | 0.4 | 0.3 | 0.6 | 0.5 | 0.6 | 0.4 | 0.5 |
| I.V. of copolymer dl/g | 2.28 | 2.21 | 2.51 | 2.39 | 2.67 | 2.59 | 2.4 | — | 2.14 | 2.05 | 2.41 | 2.58 | 2.51 |
| Ethylene content in copolymer % wt. | 2.3 | 3.3 | 3.8 | 3.6 | 2.4 | 2.3 | 3.1 | — | 3.3 | 2.2 | 2.8 | 2.8 | 2.1 |
| Xylene soluble fraction % wt. | 6.7 | 7.0 | 7.1 | 8.1 | 6.7 | 4.9 | 7.7 | — | 8.5 | 5.9 | 5.7 | 6.5 | 3.9 |
| I.V. soluble of xylene fraction dl/g | 1.21 | 0.98 | 1.35 | 1.41 | 1.33 | 1.32 | 1.53 | — | 1.2 | 1.60 | 1.08 | 1.35 | 1.3 |
| Xylene insoluble fraction % wt. | 93.3 | 93.0 | 92.9 | 91.9 | 93.3 | 95.1 | 92.3 | — | 91.5 | 94.1 | 94.3 | 93.5 | 96.1 |
| I.V. insoluble xylene fraction dl/g | 2.33 | 2.26 | 2.62 | 2.46 | 2.70 | 2.64 | 1.39 | — | 2.2 | 2.05 | 2.48 | 2.58 | 2.54 |
| 2nd. PHASE | | | | | | | | | | | | | |
| Pressure Kg/cm | 8.6 | 9.0 | 9.0 | 8.2 | 8.0 | 8.3 | 7.5 | — | 9.1 | 9.2 | 8.2 | 8 | 8.4 |
| Time min. | 85 | 30 | 18 | 10 | 13 | 20 | 10 | — | 65 | 25 | 15 | 20 | 23 |
| Propylene (saturation) g | 237 | 237 | 237 | 200 | 180 | 180 | 143 | — | 264 | 237 | 200 | 180 | 86 |
| Ethylene (saturation) g | 26 | 35 | 35 | 45 | 55 | 55 | 72 | — | 19 | 35 | 45 | 55 | 115 |
| Ethylene, mixture fed % wt. | 25 | 30 | 30 | 40 | 50 | 50 | 60 | — | 18 | 30 | 40 | 50 | 80 |
| Hydrogen in gas phase % mol. | 1.3 | 0.9 | 0 | 1.0 | 0.9 | 3.3 | 1.1 | — | 1.2 | 2.5 | 0 | 0 | 12.1 |
| FINAL PRODUCT | | | | | | | | | | | | | |
| Fraction II content % wt. | 10.0 | 7.9 | 8.8 | 7.5 | 8.0 | 8.3 | 8.5 | — | 8.8 | 9.3 | 7.3 | 7.1 | 10.5 |
| Ethylene content % wt. | 4.5 | 5.4 | 5.8 | 6.3 | 6.2 | 6.2 | 8.3 | 2.8 | 4.6 | 5.3 | 5.6 | 6.1 | 9.9 |
| I.V. dl/g | 2.27 | 2.13 | 2.53 | 2.34 | 2.53 | 2.50 | 2.25 | 2.6 | 2.01 | 1.84 | 2.53 | 2.51 | 2.46 |
| Melt Index g/10 | 2.5 | 2.3 | 1.1 | 1.7 | 1.2 | 1.2 | 1.8 | 1.0 | 3.1 | 3.9 | 1.3 | 1.2 | 1.6 |
| Xylene soluble fraction % wt. | 14.3 | 13.8 | 13.9 | 13.5 | 13.3 | 11.7 | 13.1 | 6.8 | 11.2 | 11.8 | 11.0 | 11.0 | 9.0 |
| I.V. of xylene soluble fraction dl/g | 1.76 | 1.37 | 2.07 | 1.46 | 1.69 | 1.41 | 1.63 | 1.18 | 1.42 | 1.40 | 2.48 | 2.11 | 1.35 |
| Xylene insoluble fraction % wt. | 85.7 | 86.2 | 86.1 | 86.5 | 86.7 | 88.3 | 86.9 | 93.2 | 88.8 | 88.2 | 89.0 | 89.0 | 91 |
| I.V. of xylene insoluble fraction dl/g | 2.36 | 2.25 | 2.67 | 2.45 | 2.73 | 2.6 | 2.50 | 2.80 | 2.16 | 2.06 | 2.52 | 2.64 | 2.52 |
| I.V. of Fraction II dl/g | 2.16 | 1.71 | 3.91 | 1.53 | 2.00 | 1.47 | 1.75 | — | 1.91 | 1.23 | 3.77 | 3.25 | 1.38 |
| I.V.2/I.V.1 × ethylene weight content of Fraction II | 0.24 | 0.23 | 0.47 | 0.26 | 0.37 | 0.28 | 0.44 | — | 0.16 | 0.18 | 0.62 | 0.63 | 0.44 |

TABLE 2

| Examples and comparative examples | 1 | 2 | 3 | 4 | 5 | 6 | 7 | 1C | 2C | 3C | 4C | 5C | 6C |
|---|---|---|---|---|---|---|---|---|---|---|---|---|---|
| Flex modlulus MPa | 780 | 715 | 740 | 740 | 880 | 860 | 810 | 905 | 780 | 950 | 910 | 810 | 1050 |
| IZOD, 0° J/m | 31.3 | 30.4 | 36.2 | 37.0 | 40.0 | 38.0 | 44.9 | 18.5 | 24.7 | 22 | 34.2 | 31.5 | 31.4 |
| Transition temperature °C. | −8 | −6 | −8 | −5.5 | −14 | −6 | −17 | +11 | +2 | +1.5 | −8.5 | — | −1 |
| Energy, −5° C. J | 8.2 | 9.8 | 9.0 | 6.0 | 11.3 | 7.8 | 12.5 | 0.1 | 0.1 | 0.15 | 6.8 | — | 0.2 |
| Energy, −10° C. J | 0.6 | 0.27 | 0.9 | 0.9 | 5.7 | 0.2 | 10.2 | 0.1 | 0.1 | 0.1 | 0.3 | — | 0.1 |
| Tensile strength MPa | 24.8 | 22.4 | 17.2 | 22.0 | 24.8 | 24.2 | 23 | 26.3 | 24.5 | 24.8 | 25.6 | 18.1 | 27.7 |
| Yield at break MPa | 22.3 | 24.4 | 24.0 | >23.3 | 21.0 | >24.4 | 24.5 | >24.6 | 24.2 | 23.2 | >24.1 | 24.7 | 23.0 |
| Elongation at break % | 530 | >460 | >460 | >490 | 390 | >495 | >460 | >520 | >460 | >530 | >540 | >460 | 515 |
| HAZE, final product % | 31.0 | 30.6 | 22.3 | 26.5 | 24.7 | 26.0 | 33 | 32.7 | 35.1 | 28.2 | 57.0 | 42.0 | — |
| HAZE with nucleating agent % | 20.3 | 16.3 | 16.0 | 13.9 | 15.7 | 16.9 | 20.5 | 16.6 | 15.8 | 22.5 | 48.5 | 33.5 | 14 |
| Melting point °C. | 147.5 | 146.5 | 144.0 | 144.5 | 148.0 | 148.0 | 145.5 | 146.0 | 146.5 | 148.0 | 147.0 | 148.0 | 149.0 |
| Bulk density g/cc | 0.515 | 0.510 | 0.510 | 0.510 | 0.490 | 0.505 | 0.490 | 0.515 | 0.515 | 0.520 | 0.510 | 0.510 | 0.467 |

TABLE 1B

| | EXAMPLES | | | |
|---|---|---|---|---|
| | 8 | 9 | 10 | 7C* |
| 1ST PHASE | | | | |
| Pressure, kg/cm | 30.8 | 31.0 | 30.9 | 30.8 |
| Time, min. | 100 | 130 | 130 | 80 |
| Ethylene in gas phase, % mol. | 1.58 | 2.10 | 1.86 | 1.55 |
| Hydrogen in gas phase, % mol. | 0.33 | 0.43 | 0.36 | 0.32 |
| IV of copolymer (IV.1), dl/g | 2.49 | 2.62 | 2.40 | 2.44 |
| Ethylene content in copolymer, % wt. | 3.1 | 2.1 | 3.4 | 2.8 |
| FINAL PRODUCT | | | | |
| Fraction (2) content, % wt. | 10.3 | 13.0 | 10.7 | 12.2 |
| Ethylene content, % wt. | 6.2 | 7.9 | 10.4 | 10.6 |
| Butene-1 content, % wt. | 6.9 | 6.9 | 3.4 | 4.0 |
| IV, dl/g | 2.30 | 2.57 | 2.27 | 2.44 |
| M.I., g/10 | 1.0 | 1.0 | 1.4 | 1.0 |
| Xylene soluble fraction, % wt. | 11.8 | 13.1 | 12.1 | 11.6 |
| IV of xylene soluble fraction (IV.2), dl/g | 1.68 | 1.35 | 1.21 | 1.81 |
| Xylene insoluble fraction, % wt. | 89.2 | 86.9 | 87.9 | 88.4 |
| IV of xylene insoluble fraction, dl/g. | 2.39 | 2.68 | 2.44 | 2.53 |
| IV of fraction 2, dl/g. | 2.18 | 1.34 | 1.72 | 2.35 |

TABLE 1B-continued

|  | EXAMPLES | | | |
| --- | --- | --- | --- | --- |
|  | 8 | 9 | 10 | 7C* |
| IV.2/IV.1 × ethylene weight content of fraction 2 | 0.29 | 0.24 | 0.49 | 0.64 |

*COMPARATIVE EXAMPLE

TABLE 2B

|  | EXAMPLES | | | |
| --- | --- | --- | --- | --- |
|  | 8 | 9 | 10 | 7C* |
| Flex modulus, MPa | 740 | 855 | 810 | 920 |
| Izod, 0° C., J/m | 67.8 | 118 | 55.5 | 58.9 |
| Transition Temperature, °C. | −11 | −10 | −11 | −34 |
| Energy, −5° C., J | 12.6 | 13.8 | 12.6 | 13.4 |
| Energy, −10° C., J | 5.4 | 3 | 6.2 | 9.8 |
| Tensile strength, MPa | 24.7 | 25.5 | 23.5 | 26.2 |
| Yield at break, MPa | >26.1 | >26.6 | >25.2 | 26.1 |
| Elongation at break, % | >480 | >480 | >450 | 500 |
| HAZE, final product, % | — | — | — | — |
| HAZE with nucleating agent, % | 23.1 | 16.2 | 19.9 | 34.7 |
| Melting point, °C. | 142.3 | 149.5 | 142.3 | 146.2 |
| Bulk density, g/cc | 0.515 | 0.520 | 0.520 | 0.510 |

*COMPARATIVE EXAMPLE

We claim:

1. A polymer composition obtained by sequential polymerization consisting essentially of:
   a) 70–98% by weight of a crystalline copolymer of propylene with ethylene and/or with a $CH_2=CHR$ alpha olefin, where R is a linear or branched alkyl radical with 2–8 carbon atoms containing 85 to 99.5% by weight of propylene, b) 2–30% by weight of elastomeric copolymer of ethylene with propylene and/or a $CH_2=CHR$ olefin, where R is defined as above containing from 20 to 70% by weight of ethylene, said copolymer (b) being partially soluble in xylene at room temperature and being furthermore characterized by the fact that the ratio between the ethylene weight content in the copolymer and the weight of the portion of copolymer soluble in xylene is less than 1.5, while the intrinsic viscosity (I.V.2.) of the portion soluble in xylene satisfies the following relation:

$$0.2 \leq (I.V.2/I.V.1) \times (C_2^-) \leq 0.6$$

where I.V.1 is the intrinsic viscosity of the crystalline propylene copolymer a), I.V.1 and I.V.2 are expressed in dl/g and ($C_2^-$) is the ethylene weight content of the elastomeric copolymer b).

2. The polymer composition of claim 1 comprising 80–95% by weight of a crystalline propylene copolymer a), which contains 90 to 98% by weight of propylene and from 1 to 5% by weight of ethylene, and 5–20% by weight of elastomeric copolymer b), which contains from 25 to 60% by weight of ethylene.

3. The composition of claim 1, wherein the weight percentage of the portion soluble in xylene at room temperature is between 10 and 25%, and the ratio between the weight of the ethylene in the elastomeric copolymer and the weight of the soluble portion is between 0.3 and less than 1.5.

4. The composition of claim 2, wherein the weight percentage of the portion soluble in xylene is between 10 and 25%, and the ratio between the weight of the ethylene in the elastomeric copolymer and the weight of the soluble fraction is between 0.3 and less than 1.5.

* * * * *

UNITED STATES PATENT AND TRADEMARK OFFICE
CERTIFICATE OF CORRECTION

PATENT NO. : 5,298,561  Page 1 of 2

DATED : March 29, 1994

INVENTOR(S) : Giuliano Cecchin et al

It is certified that error appears in the above-identified patent and that said Letters Patent is hereby corrected as shown below:

In the Abstract, line 13, change "$0.2 \leq (I.V. 2/I.V. 1) \times (C_2-) \leq 0.6$" to --$0.2 \leq (I.V. 2/I.V. 1) \times (C_2^=) \leq 0.6$--.

In the Abstract, line 15, change "$(C_2-)$" to --$(C_2^=)$--.

At col. 2, line 48, change "$0.2 \leq (I.V. 2/I.V. 1) \times (C_2-) \leq 0.6$" to --$0.2 \leq (I.V. 2/I.V. 1) \times (C_2^=) \leq 0.6$--.

At col. 2, line 52, change "$(C_2-)$" to --$(C_2^=)$--.

At col. 3, line 14, change "$0.2 \leq (I.V. 2/I.V. 1) \times (C_2-) \leq 0.6$" to --$0.2 \leq (I.V. 2/I.V. 1) \times (C_2^=) \leq 0.6$--.

At col. 5, line 41, change "A" to --$\overset{\circ}{A}$--.

At col. 12, line 11, change "$0.2 \leq (I.V. 2/I.V. 1) \times (C_2-) \leq 0.6$" to --$0.2 \leq (I.V. 2/I.V. 1) \times (C_2^=) \leq 0.6$--.

UNITED STATES PATENT AND TRADEMARK OFFICE
CERTIFICATE OF CORRECTION

PATENT NO. : 5,298,561
DATED : March 29, 1994
INVENTOR(S) : Giuliano Cecchin et al It is certified that error appears in the above-indentified patent and that said Letters Patent is hereby corrected as shown below:

At col. 12, line 15, change "$(C_2-)$" to --$(C_2^-)$--.

Signed and Sealed this

Twenty-ninth Day of November, 1994

Attest:

BRUCE LEHMAN

*Attesting Officer*  *Commissioner of Patents and Trademarks*